(No Model.)
Z. T. SAILER.
DENTAL TOOL STERILIZING APPARATUS.
No. 526,462. Patented Sept. 25, 1894.
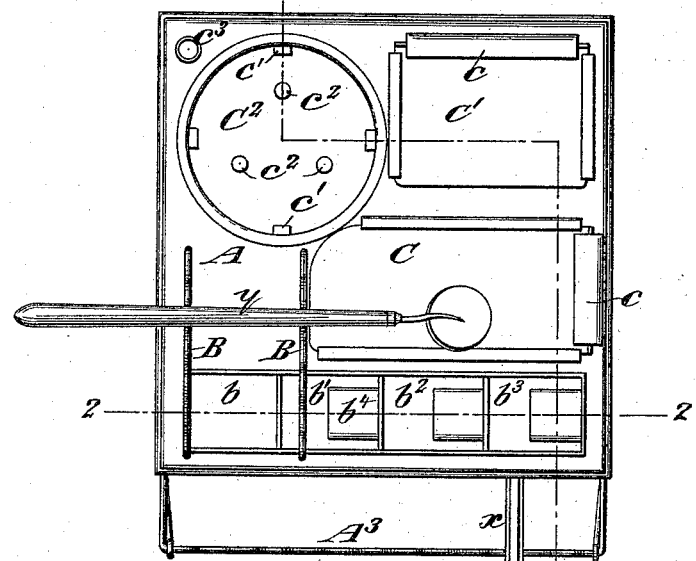
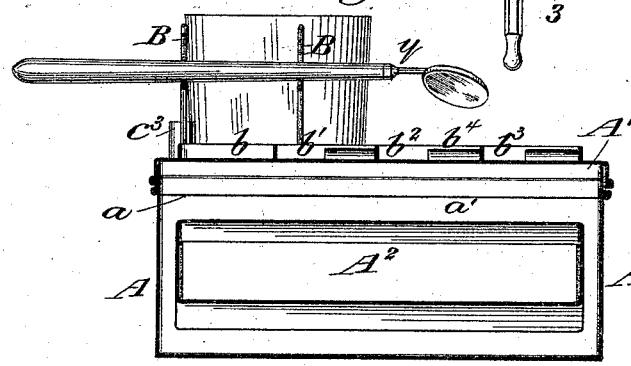
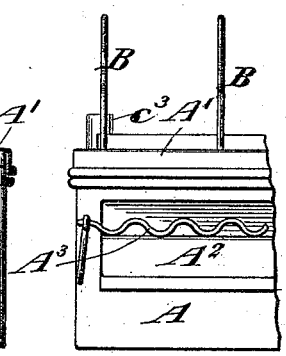
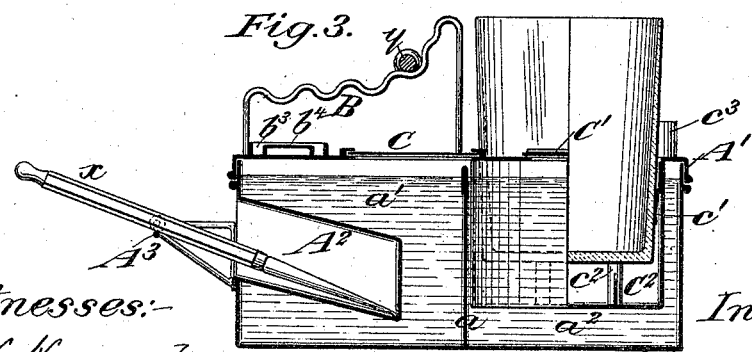
Witnesses:—
D. N. Hayford
Joseph Dela Mar
Inventor:—
Zachary T. Sailer
By his Atty. W. L. Bennem

UNITED STATES PATENT OFFICE.

ZACHARY T. SAILER, OF NEW YORK, N. Y.

DENTAL-TOOL-STERILIZING APPARATUS.

SPECIFICATION forming part of Letters Patent No. 526,462, dated September 25, 1894.

Application filed April 6, 1893. Serial No. 469,260. (No model.)

*To all whom it may concern:*

Be it known that I, ZACHARY T. SAILER, of the city, county, and State of New York, have invented certain new and useful Improvements in Sterilizing Apparatus, of which the following is a specification.

This invention relates more particularly to devices or apparatus for sterilizing dental instruments, the object being to provide such an apparatus wherein wet and dry heat may be employed for sterilizing and warming the instruments, warming soft fillings, antiseptics, modeling wax, &c.

I will describe an apparatus embodying my invention and then point out the novel features in claims.

In the accompanying drawings, Figure 1, is a top or plan view of an apparatus embodying my improvements. Fig. 2, is a section through the line 2, 2, of Fig. 1. Fig. 3, is a section through the line 3, 3, of Fig. 1. Fig. 4, is a fragmentary portion of the apparatus showing the instrument support.

Referring by letter to the drawings, A, designates a casing of suitable metal adapted to be placed over a heat supply, such, for instance, as a gas burner. The casing has a top portion $A'$, which is preferably made in the form of a movable cover so that the interior of the casing may be easily cleansed when not in use. The casing is provided with a vertical partition $a$, dividing it into chambers $a'$, $a^2$, for containing water.

$A^2$, is a dry heating chamber for instruments. It extends into the water chamber $a'$, and has an outward opening through the front wall of the casing. The bottom of the chamber $A^2$, is shown as inclined downward and is raised above the bottom of the casing A, and the chamber is free from the sides and top of the casing so that it may be wholly submerged in water.

An instrument support or bracket $A^3$, extends longitudinally across the opening of the dry heating chamber $A^2$. This support or bracket extends outward from the front of the casing and may be formed of wire. It is shown as formed with depressions to receive the shanks of the instruments and prevent their rolling. I have shown an instrument $x$, in place. A rack formed of suitable material, such as wires B, extends upward from the top or cover $A'$. This rack is designed to support instruments requiring but a moderate degree of heat, such as a mouth-mirror, $y$. Trays $b$, $b'$, $b^2$, $b^3$, are formed on the upper side of the top or cover $A'$, and are designed to hold soft fillings for the purpose of warming. I have shown some of these trays as provided with longitudinally extended pockets $b^4$, upon which fillings may be placed when it is desired to give them a less degree of heat than could be obtained in the trays outside the pockets, inasmuch as air freely circulates through the pockets. Medicated or absorbent cotton may be placed in the tray from which a pocket is omitted.

The top or cover $A'$, is provided with a slide cover C, over the chamber $a'$, and a slide cover $C'$, over the chamber $a^2$, and these slide covers are provided with hand pieces $c$, which are preferably of an insulating material, such as wood.

$C^2$, is a receiver for a tumbler or other vessel for antiseptics. This receiver extends into the chamber $a^2$, so as to be entirely surrounded with the water in the chamber, and it has an outward opening through the top or cover $A'$.

The inner wall of the receiver $C^2$, has downwardly and inwardly extended fingers $c'$, attached to it. These fingers are slightly resilient so as to engage closely against the tumbler or other vessel and hold it firmly in position slightly away from the receiver so that air can circulate freely around the tumbler. I may also provide supports $c^2$, extended upward from the bottom of the receiver upon which the bottom of the tumbler or other vessel may rest.

A vent $c^3$, is provided for the escape of steam from the water chambers should any be formed.

In operation the apparatus, with its water chambers nearly filled, is placed over a suitable heater, and the different articles desired to be used in an operation are placed in position. When modeling wax is used and it is desired to slightly heat it for the purpose of making it pliable, the slide cover C, may be slid out and the wax dipped into the hot water.

Having described my invention, what I claim is—

1. The combination of the casing having a hot water chamber and the receiver adapted to be entirely surrounded by water in the chamber and having the fingers attached to its inner side, substantially as specified.

2. The combination of the casing for containing hot water, the removable top or cover therefor, a slide cover therefor and a tray or trays on said top or cover, substantially as specified.

3. In a sterilizing apparatus for dental use, the combination of a casing having a partition forming the water chambers, the dry heating chamber extended into one of said water chambers, the receiver extended into the other of said water chambers, the filling trays, the instrument support and the rack, substantially as specified.

ZACHARY T. SAILER.

Witnesses:
JOSEPH DELA MAR,
JAS. E. WARNER.